United States Patent
Ito

(10) Patent No.: US 8,823,867 B2
(45) Date of Patent: Sep. 2, 2014

(54) CAMERA WITH FOCUS DETECTION UNIT

(75) Inventor: Satoru Ito, Komae (JP)

(73) Assignee: Olympus Imaging Corp., Tokyo (JP)

( * ) Notice: Subject to any disclaimer, the term of this patent is extended or adjusted under 35 U.S.C. 154(b) by 130 days.

(21) Appl. No.: 13/543,346

(22) Filed: Jul. 6, 2012

(65) Prior Publication Data

US 2013/0016277 A1    Jan. 17, 2013

(30) Foreign Application Priority Data

Jul. 14, 2011 (JP) ................................ P2011-155413

(51) Int. Cl.
    *G03B 13/00*  (2006.01)
    *H04N 5/232*  (2006.01)
    *H04N 5/222*  (2006.01)

(52) U.S. Cl.
    USPC .......................... 348/353; 348/345; 348/371

(58) Field of Classification Search
    USPC ....................................................... 348/353
    See application file for complete search history.

(56) References Cited

U.S. PATENT DOCUMENTS

| | | | |
|---|---|---|---|
| 5,293,194 A * | 3/1994 | Akashi | 396/104 |
| 6,424,808 B2 * | 7/2002 | Furukawa | 396/104 |
| 7,224,397 B2 * | 5/2007 | Sasaki | 348/348 |
| 8,446,518 B2 * | 5/2013 | Tanaka | 348/353 |
| 2003/0048372 A1 * | 3/2003 | Yasuda | 348/349 |
| 2005/0206738 A1 * | 9/2005 | Kumaki et al. | 348/208.99 |
| 2006/0216012 A1 * | 9/2006 | Kuo et al. | 396/106 |
| 2008/0037976 A1 * | 2/2008 | Funaki et al. | 348/370 |
| 2008/0240700 A1 * | 10/2008 | Takagi | 396/98 |
| 2010/0247084 A1 * | 9/2010 | Kato | 396/61 |

FOREIGN PATENT DOCUMENTS

JP      08-327888      12/1996

* cited by examiner

*Primary Examiner* — Tuan Ho
*Assistant Examiner* — Jason Flohre
(74) *Attorney, Agent, or Firm* — John C. Pokotylo; Straub & Pokotylo

(57) ABSTRACT

A camera of the present invention comprises a contrast detection section for detecting a contrast value, an assist light section for irradiating a subject by emitting light at a first luminance amount or a second luminance amount that is dimmer than the first luminance amount, and a control section for moving the photographing lens and detecting a focus position of the photographing lens based on contrast values detected by the contrast detection section, wherein the control section causes the assist light section to emit assist light in a first luminance amount or a second luminance amount, and detects a focus position of the photographing lens based on one of a first contrast value detected in a state where the assist light section emits light in the first luminance amount, or a second contrast value detected in a state where the assist light section emits light in the second luminance amount.

18 Claims, 7 Drawing Sheets

CAMERA WITH FOCUS DETECTION UNIT

Benefit is claimed, under 35 U.S.C. §119, to the filing date of prior Japanese Patent Application No. 2011-155413 filed on Jul. 14, 2011. This application is expressly incorporated herein by reference. The scope of the present invention is not limited to any requirements of the specific embodiments described in the application.

BACKGROUND OF THE INVENTION

1. Field of the Invention

The present invention relates to a camera having a focus adjustment function for carrying our focus detection using assist light.

2. Description of the Related Art

There are two types of autofocus for a camera, namely active type and passive type, and with the active type light is projected at the time of ranging, while with the passive type, such as a contrast AF method, there is no projection of light. However, since ranging becomes impossible in cases where the subject is dark or there is low contrast, it is common practice to carry out focusing, even with the passive autofocus, using assist light. For example, Japanese patent laid-open No. Hei. 8-327888 (laid open Dec. 13, 1996) discloses an autofocus camera in which focus detection is carried out without using assist light, and in the event that detection is not possible, focus detection is carried out again while irradiating assist light.

SUMMARY OF THE INVENTION

The present invention has as its object to provide a camera that is capable of a high speed focusing operation, even in a situation where assist light is used.

A camera of the present invention, having an image sensor for forming a subject image via a photographing lens, comprises a contrast detection section for detecting a contrast value based on image data acquired from the image sensor, an assist light section for irradiating a subject by emitting light at a first luminance amount or a second luminance amount that is dimmer than the first luminance amount, and a control section moving the photographing lens and detecting a focus position of the photographing lens based on contrast values detected by the contrast detection section at different positions of the photographing lens, wherein the control section causes the assist light section to emit assist light in a first luminance amount or a second luminance amount when acquiring arbitrary image data from the image sensor, and detects a focus position of the photographing lens based on one of a first contrast value that is detected by the contrast detection section in a state where the assist light section emits light in the first luminance amount according to a position of the photographing lens, or a second contrast value that is detected by the contrast detection section in a state where the assist light section emits light in the second luminance amount according to a position of the photographing lens.

A camera of the present invention, having an image sensor for forming a subject image via a photographing lens, comprises a contrast detection section for detecting a contrast value based on image data acquired from the image sensor, an assist light section for irradiating a subject by emitting light at a first luminance amount, and a control section moving the photographing lens and detecting a focus position of the photographing lens based on contrast values detected by the contrast detection section at different positions of the photographing lens, wherein the control section causes the assist light section to either emit assist light in a first luminance amount or turn off when acquiring arbitrary image data from the image sensor, and detects a focus position of the photographing lens based on one of a first contrast value that is detected by the contrast detection section when the assist light section has emitted light in the first luminance amount, or a second contrast value that is detected in a state where the assist light section is off.

A camera of the present invention, having an image sensor for forming a subject image via a photographing lens, comprises a contrast detection section for detecting a contrast value based on image data acquired from the image sensor, an assist light section for irradiating a subject by emitting light at a first luminance amount, and a control section for carrying out focusing of the photographing lens by selecting one of either of a first focusing mode, where focus position of the photographing lens is detected, while moving the photographing lens, based on a first contrast value detected by the contrast detection section with a first luminance amount being emitted at a plurality of positions of the photographing lens, a second focusing mode, where a second focus position of the photographing lens is detected, while moving the photographing lens, based on second contrast value detected by the contrast detection section with no assist light at a plurality of positions of the photographing lens, and a third focusing mode where the first contrast value and second contrast value are detected by alternately repeating emission of the first luminance amount and no emission, while moving the photographing lens.

DETAILED DESCRIPTION OF THE PREFERRED EMBODIMENT

Preferred embodiments using a camera to which the present invention has been applied will be described in the following in accordance with the drawings. A camera of one preferred embodiment of the present invention is a digital camera, and has an imaging section (corresponding to an image sensor 13 and image signal processing circuit 15 that will be described later), with a subject image being converted to image data by this imaging section, and the subject image then being subjected to live view display on a display section (not shown) arranged on a rear surface etc. of a camera body based on this converted image data.

Also, if the photographer carries out an action such as pressing a release button down halfway, a focusing operation is executed. The focusing operation is carried out by obtaining a peak for contrast value based on image data, while moving the photographing lens. At this time, assist light is irradiated at a first luminance amount, or assist light is irradiated at a second luminance amount that is dimmer than first luminance amount (in this embodiment it is actually unlit), and focus position of the photographing lens is determined by selecting either a first contrast value that was acquired at the first luminance amount, or a second contrast value that was acquired at the second luminance amount (Also including the situation where the second luminance amount is 0. Corresponding to the unlit state in this embodiment). At the time of a release operation image data is stored in a storage medium.

Figure 1:
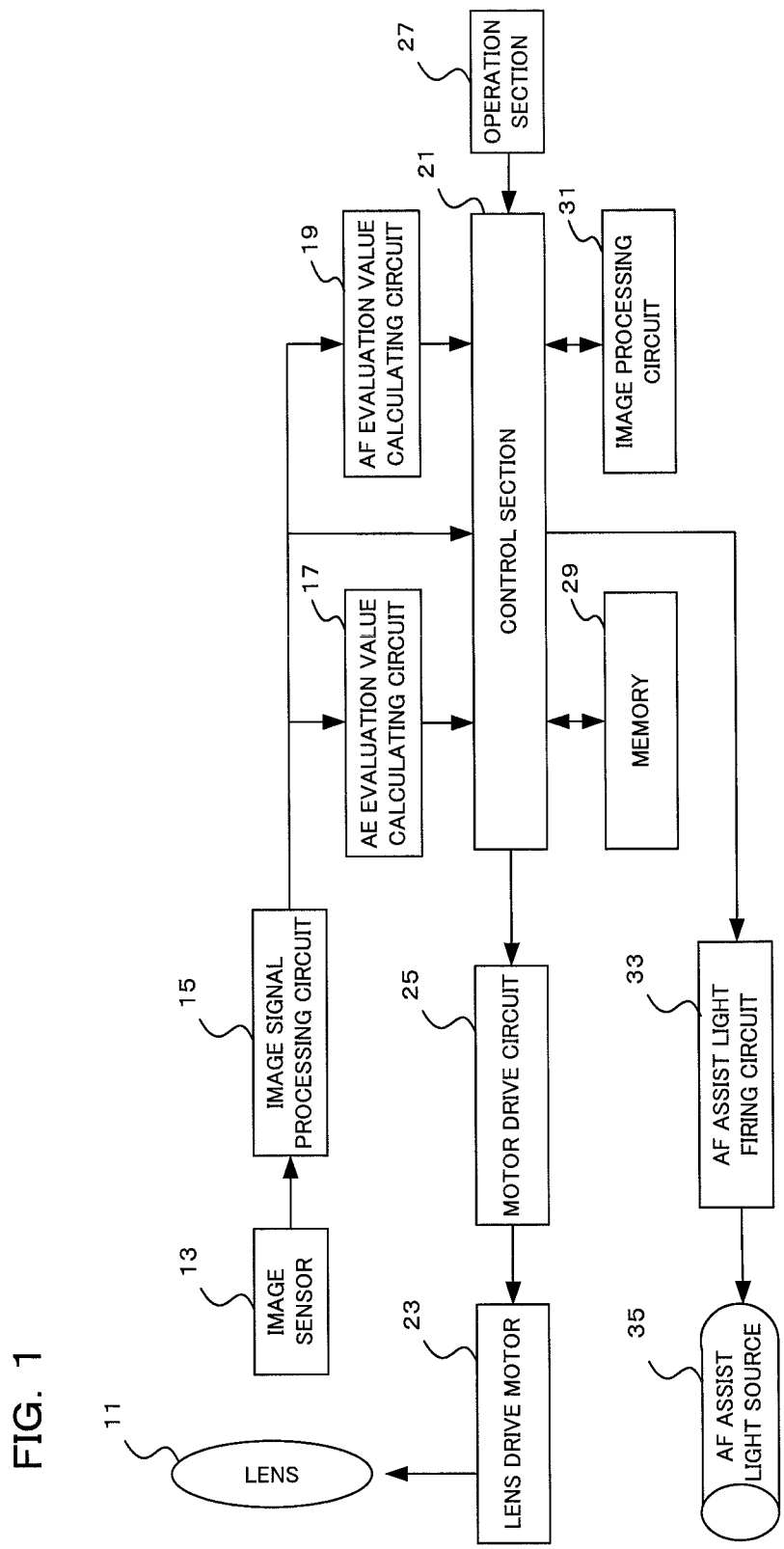
FIG. 1 is a block diagram mainly showing electrical circuits of a camera of one embodiment of the present invention.

FIG. 1 is a block diagram mainly showing the electrical structure of a camera of one embodiment of the present invention. This camera comprises a photographing lens 11, an image sensor 13, a image signal processing circuit 15, an AE evaluation value calculation circuit 17 an AF evaluation value calculation circuit 19 and a control section 21 that are connected to the image signal processing circuit 15, a motor drive circuit 25, an operation section 27, memory 29, AF assist light firing circuit 33 and image processing circuit 31 etc. that are connected to the control section 21

The photographing lens 11 is constituted by a plurality of optical lenses for forming a subject image, and is a fixed focal length lens or a zoom lens. On the optical axis of this photographing lens 11, an image sensor 13 is arranged at a position where the subject image is formed. The image sensor 13 performs imaging of a subject image that has been formed by the photographing lens 11. This image sensor 13 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode.

The image signal processing circuit 15 performs charge storage control and image signal readout control etc. for the image sensor 13. Image signals that are being read out by the image signal processing circuit 15 (also referred to as image data) are output to the AE evaluation value calculation circuit 17, the AF evaluation value calculation circuit 19, and the control section 21.

The AE evaluation value calculation circuit 17 calculates an AE evaluation value corresponding to subject brightness based on from the image signal processing circuit 15, and outputs an AE evaluation value to the control section 21. The AE evaluation value calculation section 17 functions as a subject brightness detection section for detecting subject brightness based on image data acquired from the image sensor 13.

The AF evaluation value calculation circuit 19 calculates a contrast value (also referred to as AF evaluation value) by extracting high-frequency components from within image data, and outputs this contrast value to the control section 21. As a contrast value, for example, it is possible to perform calculations from brightness difference between adjacent pixels etc. The AF evaluation value calculation circuit 19 functions as a contrast detection section, for detecting a contrast value based on image data.

The control section 21 outputs a focus control signal based on a contrast value, and the motor drive circuit 25 carries out control such as forward rotation, reverse rotation, stop and drive speed for a lens drive motor 23 based on this focus control signal. The lens drive motor 23 is capable of driving the photographing lens 11 forwards and backwards in the optical axis direction, and drives the photographing lens 11 based on a control signal from the motor drive circuit 25.

The operation section 27 includes various operation members provided in the camera, with operating states of the various operation members being detected, and detection signals transmitted to the control section 21. As the various operation members there are a power supply button, a release button, a movie button, a camera mode selection dial, a menu button, a cross-key button, an OK button, and a playback button etc.

The release button inside the operation section 27 has a two-stage switch with a first release switch and a second release switch. If the release button is pressed down halfway, the first release switch is turned on, and if the release button is pressed down further from the halfway point to a fully pressed state the second release switch is turned on. If the first release switch is turned on, the control section 21 executes shooting preparation sequences such as AE processing and AF processing. If the second release switch is turned on, the control section 21 executes a shooting sequence and takes a picture.

The memory 29 is a nonvolatile memory such as flash ROM, and stores programs executed by the control section 21, and various adjustment values etc. Also, the memory 29 includes volatile memory such as DRAM and SDRAM, used to temporarily store various data such as image data and control commands.

The image processing circuit 31 is input with image data, image processing is applied, and image data that has been subjected to this image processing is output to the control section 21. As image processing, noise reduction processing, white balance correction, demosaicing processing, color conversion, tone conversion (gamma conversion), edge enhancement, and YC conversion are carried out. Compression processing of image data that has been YC converted, and expansion processing of image data that has been compressed, are also carried out.

The AF assist light firing circuit 33 carries out firing control of an AF assist light source 35 in accordance with commands from the control section 21. There are three ways of executing this firing control, namely lighting control to place the AF assist light source 35 in a firing state, extinction control for placing the AF assist light source 35 in a non-firing state, and repeated firing control repeatedly alternating between the lit up state and the off state in synchronization with each frame of a taken image. The AF assist light source 35 has an assist light source such as an LED, and irradiates assist light to a subject. The assistant light source is not limited to LED, and it is also possible to use another light source such as a xenon tube. The AF assist light source 35 and the AF assist light firing circuit 33 function as an assist light section for irradiating a subject by emitting light at a first luminance amount, or a second luminance amount that is dimmer than the first luminance amount (this includes being off).

The control section 21 performs control of the entire camera, and carries out control over each section in accordance with a program stored in memory 29, such as flash ROM (not shown), based on detection signals from the operation section 27 and signals from other circuits. Also, the control section 21 detects focus position of the photographing lens 11 while moving the photographing lens 11, based on a contrast value detected by the AF evaluation value calculation circuit 19 at the plurality of different positions. In this detection of focus position, detection is based on a first contrast value detected by the AF evaluation value calculation circuit 19 with the AF assist light source 35 in a firing state, or a second contrast value detected by the AF evaluation value calculation circuit 19 with the AF assist light source in an off state, when acquiring image data.

Also, the control section 21 changes the position of the photographing lens 21 in time series (that is, carries out lens scanning), and also causes the AF assist light source to change the firing state and the unlit state, to alternatively detect a first contrast value and a second contrast value using the AF evaluation value calculation circuit 19 to detect focus position of the photographing lens 11.

The control section 21 also detects focus position of the photographing lens 11 by selecting one of either a first contrast value or a second contrast value based on priority judgment results that are based on a subject brightness value (Bv value) detected with the AF assist light source 35 in the unlit state, and a contrast integrated value (AF evaluation value) and brightness integrated value (AE evaluation value). The above described selection processing will be described later using flow of assist light firing processing shown in FIG. 3 (particularly step S31).

Also, the control section 21 detects focus position of the photographing lens 11 based on the first contrast value when rate of change of AE evaluation values detected at different positions of the photographing lens 11 is less than a specified value. On the other hand, when rate of change of AE evaluation values is greater than or equal to a specified value focus position of the photographing lens 11 is detected based on the second contrast value. This selection in accordance with rate of change of the AE evaluation value will be described later using the flow for priority judgment processing shown in FIG. 4 (particularly steps S51 and S55).

The control section 21 may also detect focus position of the photographing lens 11 by selecting one of either a first contrast value or a second contrast value based on priority judgment results that are based on a second contrast value detected in the unlit state. This selection will be described later using the flow for priority judgment shown in FIG. 4 (particularly steps S53 and S55).

The control section 21 may also detect focus position of the photographing lens 11 based on a first contrast value when the rate of change of the second contrast value is less than or equal to a second specified value, and detect focus position of the photographing lens based on the second contrast value when the rate of change of the second contrast value is greater than or equal to the second specified value. This detection will be described later using the flow for priority judgment shown in FIG. 4.

Also, the control section 21 selects one of either a first luminance amount or a second luminance amount in accordance with which of the first contrast value and the second contrast value is selected, and causes the assist light section to emit light with the selected luminance amount, and also doubles the speed at which the photographing lens is moved and then moves the photographing lens, and detects focus position. This detection will be described later using the flow for evaluation value selection processing shown in FIG. 5 (particularly steps S79-S85).

Next, a focusing operation of one embodiment of the present invention will be described using the flowcharts shown in FIG. 2-FIG. 5. This flowchart is executed by the control section 21 in accordance with the program stored in the memory 29.

Figure 2:
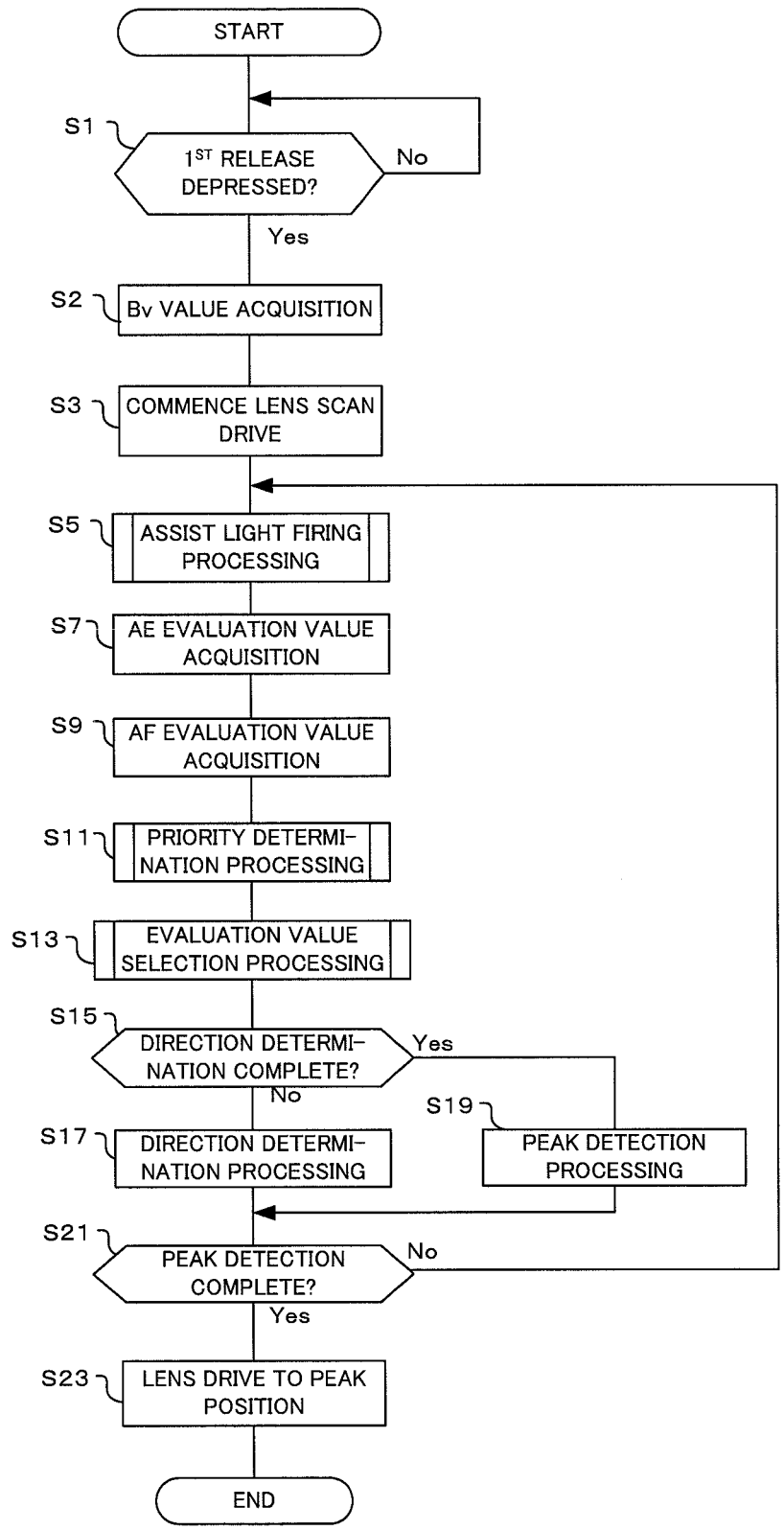
FIG. 2 is a flowchart showing a focusing operation of the camera of one embodiment of the present invention.

If the processing flow shown in FIG. 2 starts, it is first determined whether or not a first release has been pressed down (S1). Here determination is carried out based on a first release switch detection signal from the operation section 27. If the result of this determination is that the first release has not been pressed down, a standby state is entered to await the first release being pressed down.

If the result of determination in Step S1 is that the first release has been pressed down, the AE evaluation value calculation circuit 17 calculates subject brightness (Bv) based on image data from the image sensor 13 (S2). A Bv value that was acquired in a step immediately after the result of determination in Step S1 was that the first release has been pressed down is stored in the memory 29 as Bv when the first release is pressed down. This Bv value is used at the time of determination in step S31 (refer to FIG. 3) that will be described later.

Next, scanning drive is commenced (S3) in order to carry out a focus adjustment operation using contrast AF. Here, the control section 21 commences drive of the lens drive motor 23 by means of the motor drive circuit 25, and drives the photographing lens 11 in a specified direction to the close-up end or the infinity end.

Once lens scan drive is started, assist light firing processing is next carried out (S5). With this assist light firing processing, a firing control method for the AF assist light source 35 is determined as either turned off, firing, or repeatedly firing, in accordance with the surrounding brightness and results of priority judgment processing carried out in step S11, that will be described later. This assist light firing processing will be described later using FIG. 3.

Once assist light firing processing has been carried out, an AE evaluation value is next acquired (S7). Here, the AE evaluation value calculation circuit 17 calculates subject brightness integrated value for within an AE area as an AE evaluation value based on image data from the image sensor 13.

An AF evaluation value is then acquired (S9). Here, the AF evaluation value calculation circuit 19 calculates contrast value as an AF evaluation value based on image data from the image sensor 13.

Once the AF evaluation value has been acquired, priority judgment processing is carried out (S11). Here, at the time of a focusing operation, in judging drive direction of the lens drive motor 23 and a peak of a contrast value, it is determined whether priority has been given to an AF evaluation value that was acquired with assist lighting on, with assist lighting off, or with assist lighting repeatedly turned on and off. Specifically, firing priority is determined when carrying out determination of drive direction and peak of an AF evaluation value (contrast value) based on an AF evaluation value in the firing state. Also, non-firing priority is determined when carrying out the above processing in the assist light off state. Indefinite is determined when carrying out the above processing in the assist light repeatedly turned on and off. Details of this priority determination processing will be described later using FIG. 4.

Once priority determination processing has been carried out, evaluation value selection processing is carried out (S13). Here, in order to carry out drive of the lens drive motor 23 and direction judgment and peak detection based on the results of the priority determination processing, whether to use an AF evaluation value in one of either the firing or non-firing (in this embodiment assist light off) states is selected. Details of this evaluation value selection processing will be described later using FIG. 5.

Once evaluation value selection processing has been carried out, it is next determined whether or not direction judgment has been completed (S15). Focusing using contrast AF involves driving the lens drive motor 23 in a direction in which contrast value (AF evaluation value) becomes large. However, at the time of starting lens scanning, since the drive direction in which contrast value becomes large is unclear drive is performed in a previously specified direction, if the contrast value at this time becomes large drive in that direction continues, while on the other hand if the contrast value becomes small the drive direction is reversed. In this step, it is determined whether or not the direction in which the contrast value becomes large has been ascertained.

If the result of determination in step S15 is that direction determination has not been completed, direction determination processing is carried out (S17). Here, as described previously, the photographing lens 11 is driven by the lens drive motor 23, and a drive direction of the lens drive motor 23 in which a contrast value (AF evaluation value) that has been calculated by the AF evaluation value calculation circuit 19 becomes large is detected.

If the result of determination in step S15 is that direction determination has been completed, peak detection processing is next carried out (S19). Here, it is detected whether or not a peak position, where the contrast value (AF evaluation value) that has been calculated by the AF evaluation value calculation circuit 19 changes from an increasing tendency to a decreasing tendency, has been reached. If the result of the priority determination processing of step S11 is indefinite, since the AF assist light source 35 is alternating between emitting light and not emitting light, then together with detecting whether or not a contrast value when not emitting light has been reached a peak, if there is the peak in contrast value when emitting light the peak position of the photographing lens 11 at that time is temporarily stored.

Once the direction determination processing has been carried out in step S17, or peak detection processing has been carried out in step S19, it is next determined whether or not peak detection is complete (S21). As described previously, whether or not contrast value has reached a peak is detected in step S19, and in this step determination is carried out in accordance with the results of this peak detection. If the result of this determination is that peak detection is not complete, processing returns to step S5, and the previously described assist light firing processing etc. is executed based on image data of the next frame that has been acquired by the image sensor 13. At the time of the determination of step S21, it is determined that peak detection is complete even in a case where it was not possible to detect a peak at completion of scan drive within a predetermined range, such that lens scanning was performed from one end to the other end of a movable range of the photographing lens 11.

If the result of determination in step S21 is that peak detection is complete, the lens is next driven to the peak position (S23). If the result of priority determination processing is firing priority or non-firing priority, then if a contrast value (AF evaluation value) acquired with the AF assist light source 35 firing or not firing has reached a peak, a focus position is calculated based on an interpolation method or the like of focus position in front of and behind the peak position, and the photographing lens 11 is driven to this focus position. Also, if the result of priority determination processing is indefinite, contrast values are respectively acquired when there is assist light and when the AF assist light source 35 repeatedly fires and does not fire, and if a peak is detected from a contrast value at the time of no assist light and the peak is reached, focus position is calculated based on an interpolation method or like, and the photographing lens 11 is driven to this focus position. However, if it is not possible to detect a peak with contrast values acquired at the time of no assist light, in this case, after completion of drive in a predetermined range, the photographing lens 11 is driven to a peak position for contrast values that were acquired with assist light (position that was temporarily stored in step S19).

Once the photographing lens 11 has been driven to the peak position, the focusing flow is terminated.

Figure 3:
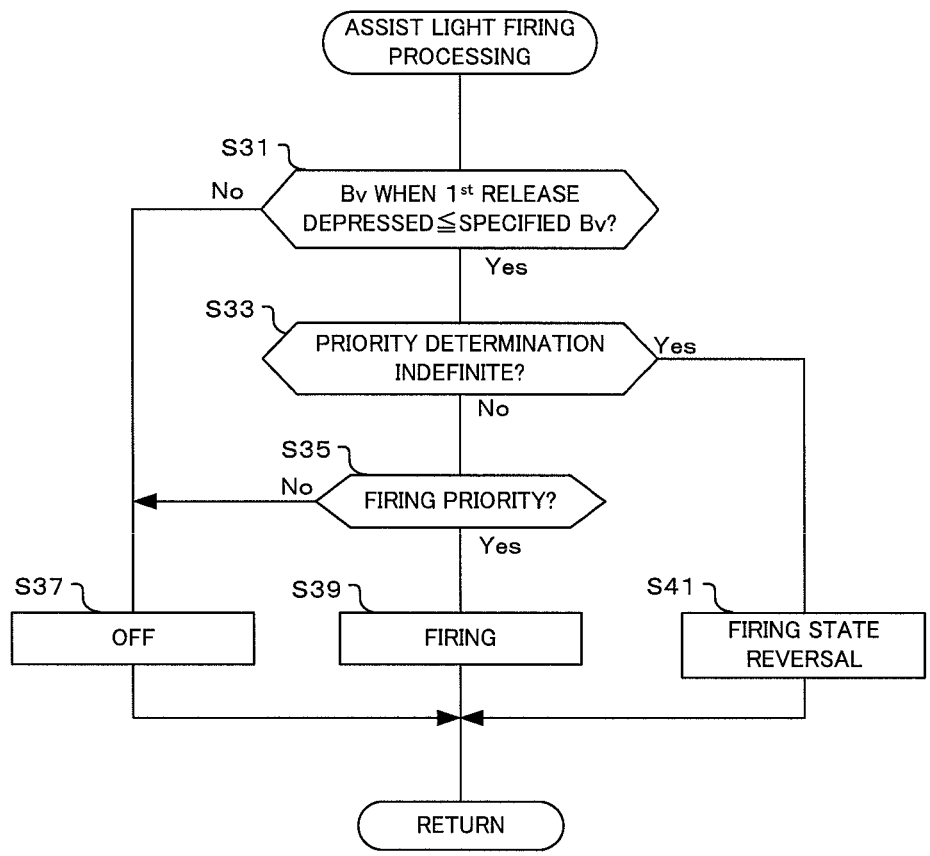
FIG. 3 is a flowchart showing operation of assist light firing processing of the camera of one embodiment of the present invention.

Next, operation of assist light firing processing in step S5 will be described using FIG. 3. If this flow is entered, it is first determined whether or not a first release depressed time Bv is less than or equal to a specified Bv (S31). A BV value at the time of first release depression is stored in previously described step S2, and so determination is carried out by reading out this Bv value and comparing with the specified Bv value. The specified Bv value may be a brightness such that the surroundings are sufficiently bight, and emission of the AF assist light source 35 is ineffective for ranging.

If the result of determination in step S31 is that the BV value at the time of first release depression is darker than the specified Bv value, it is determined whether or not priority determination is indefinite (S33). Here, it is determined whether or not the result of priority determination processing in step S11 (refer to FIG. 2) is set to indefinite. Since indefinite is set as the default value for the priority determination, if the result of determination in step S31 becomes YES immediately after first release depression, indefinite is determined at the time of processing this step.

If the result of determination in step S33 is that indefinite has been set in the priority determination, the firing state is reversed (S41). Here, the firing state of the AF assist light source 35 is alternately reversed. Specifically, in the case where the state previously was the firing state, this is reversed to unlit, and if the previous state was unlit it is reversed to the firing state. If this step is executed immediately after first release depression, then since unlit is set as the default value, the unlit state is reversed and the AF assist light source 35 is put into the firing state. As a result, the image sensor 13 performs imaging with the AF assist light source 35 in the firing state.

If the result of determination in step S33 is that indefinite has not been set in the priority determination, it is next determined whether firing priority has been set in the priority determination (S35). Here, it is determined whether or not firing priority has been set in the priority determination of step S11.

If the result of determination in step S35 is not firing priority, namely that unlit priority has been set, or if the result of determination in step S31 is that the Bv value at the time of first release depression is brighter than the specified Bv, the AF assist light source 35 is turned off (S37). As a result, the image sensor 13 performs imaging with the AF assist light source 35 in the non-firing state.

On the other hand, if the result of determination in step S35 was firing priority, the AF assist light source 35 is fired (S39). As a result, the image sensor 13 performs imaging with the AF assist light source 35 in the firing state.

If turning off of the assist light source in step S37, lighting of the assist light source in step S39, or reversing of the firing state in step S41 has carried out, the originating flow is returned to.

Next, operation of the priority determination processing of step S11 will be described using FIG. 4. If this flow is entered, first a rate of change of AE evaluation value at the time of non-lighting is calculated from current maximum AE evaluation/current minimum AE evaluation value (S51). Here, after commencing scanning in step S3, a ratio of maximum value and minimum value of AE evaluation value calculated by the AE evaluation value calculation circuit 17 is calculated, and this calculation result is made an AE evaluation value rate of change. With this embodiment, even if the surrounding environment is dark, in step S57, which will be described later, since priority determination has been set to indefinite within the specified frame from commencement of AF, it is possible to obtain AE evaluation value and AF evaluation value in the non-firing state.

Subsequently, rate of change of AF evaluation value at the time of non-firing is calculated from current maximum AF evaluation value/current minimum AF evaluation value (S53). Here, after commencing scanning in step S3, a ratio of maximum value and minimum value of AF evaluation value calculated by the AF evaluation value calculation circuit 19 is calculated, and this calculation result is made an AF evaluation value rate of change.

Once AF evaluation value rate of change at the time of non-lighting has been calculated, it is determined whether or not at least one rate of change, among the non-firing time AE evaluation value rate of change and the non-firing time AF evaluation value rate of change, is greater than or equal to a specified value (S55). Here it is determined whether the non-firing time AE evaluation value rate of change that was calculated in step S51 is greater than or equal to a specified value, or if the non-firing time AF evaluation value rate of change that was calculated in step S53 is greater than or equal to a specified value. In the event that the AE evaluation value rate of change that was calculated at the time of non-firing of the AF assist light source 35 is large, or the AF evaluation value rate of change is large, it is possible to execute the focusing operation sufficiently even without firing the AF assist light source 35.

As was described previously, contrast AF is a method of detecting a peak in AF evaluation value while scanning the photographing lens 11, which means that if the rate of change of AF evaluation value is large, peak detection is possible. Also, if rate of change of AE evaluation value is also large, this suggests the existence of a point light source. As a result, it becomes possible to detect a peak of AF evaluation value by carrying out scanning. A specified value for evaluating rate of change of a evaluation value at the time of non-firing, and the specified value for evaluating rate of change of AF evaluation value at the time of non-firing may be set to such a value that focus detection using contrast AF becomes possible, or may be set to different values for AE evaluation value and AF evaluation value If the result of determination in step S55 is that the rates of change for AE and AF evaluation value at the time of non-firing are greater than or equal to a specified value, non-firing priority is set (S63). In this case, even if the AF assist light source 35 is in the non-firing state, since focus detection is sufficiently possible using contrast AF, non-firing priority set. If non-firing priority is set, then since the determination in previously described step S35 (refer to FIG. 3) is not firing priority, in step S37 the AF assist light source 35 is turned off.

If the result of determination in step S55 is that the rates of change for AE and AF evaluation value at the time of non-firing are not greater than or equal to a specified value, it is next determined whether or not it is within a specified frame from AF commencement (S57). If the result of determination in step S55 is that the rate of change is small, the AF assist light source 35 is fired and focus detection is carried out using contrast AF. However, if the AF assist light source 35 is fired, there may be situations where false focus occurs due to high reflectance members such as glass. Also, the possibility can be considered of cases where a peak position of AF evaluation value at the time of non-firing is slightly removed from the current focus position. Taking these points into consideration, a number of determination frames for acquiring AF evaluation values for both firing and non-firing is determined to be indefinite. As well as being a fixed value, this number of frames may be determined based on focal distance of the photographing lens 11, focus lens image plane movement distance per single frame, etc.

If the result of determination in step S57 is within a specified frame from AF commencement, indefinite is set as the priority determination (S59). If indefinite is set, in previously described steps S33 and S41 (refer to FIG. 3) the AF assist light source 35 repeatedly turned on and off alternately.

On the other hand, if the result of determination in step S57 is not within the specified frame, firing priority is set as the priority determination (S61). If firing priority has been set, in previously described steps S35 and S39 (refer to FIG. 3) the AF assist light source 35 placed in a firing state.

If indefinite has been set in step S59, or if firing priority has been set in step S61, or if non-firing priority has been set in step S63, the originating flow is returned to.

Figure 5:
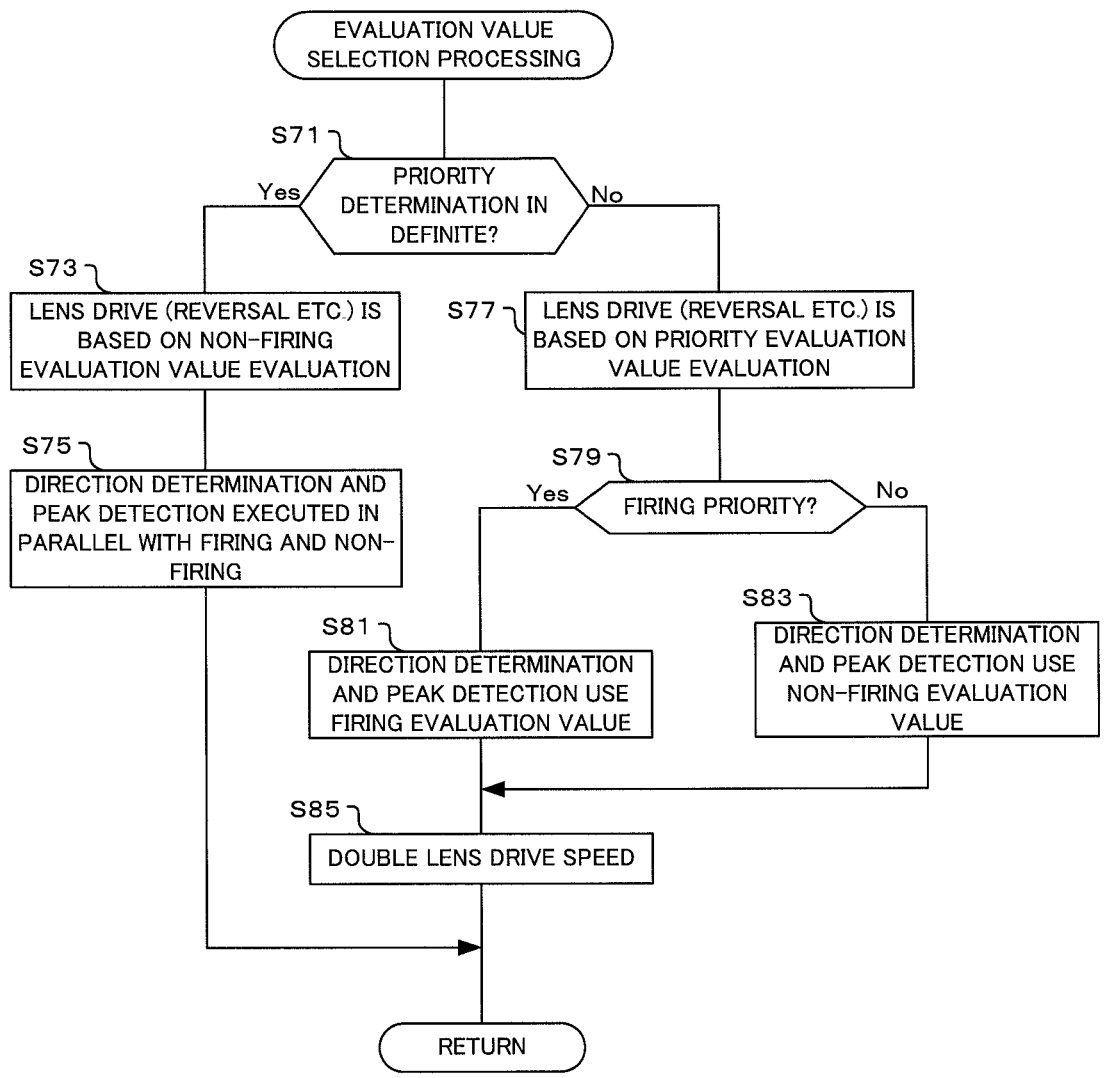
FIG. 5 is a flowchart showing operation of evaluation value selection processing of the camera of one embodiment of the present invention.

Next, operation of the evaluation value selection processing of step S13 will be described using FIG. 5. If this flow is entered, it is first determined whether or not indefinite has been set as the priority determination (S71). As described previously, it is determined whether or not indefinite has been set in step S59 within the priority determination processing of step S11.

If the result of determination in step S71 is that indefinite has been set, next lens drive (reversal etc.) is carried out based on non-firing evaluation value evaluation (S73). If indefinite has been set as the priority determination, the AF assist light source 35 is repeatedly fired and not fired alternatively for every frame, and as a result image data at the time of firing and image data at the time of non-firing are alternately acquired. In this step, in driving the photographing lens 11, execution based on AF evaluation value that was acquired by calculating image data that was acquired at the time of non-firing is selected. As described previously, drive direction is determined in step S17 (refer to FIG. 2) based on AF evaluation value that has been selected here, and if a peak value was detected in step S19 a reverse operation is carried out to stop at the focus point.

Then, direction determination and peak detection are implemented in parallel with firing and non-firing (S75). Here, in the direction determination processing of step S17, and the peak detection of step S19, execution using both firing time AF evaluation value and non-firing time AF evaluation value is selected. However, drive control for the photographing lens 11 is carried out using a non-firing time AF evaluation value that was selected in step S73, as was described previously. Direction determination processing and peak detection based on firing time AF evaluation value are simply carried out in parallel with processing based on non-firing time AF evaluation value. In the case of carrying out peak detection based on firing time AF evaluation value, a peak position is temporarily stored. In the event that it is not possible to find a peak position using non-firing time AF evaluation value, the temporarily stored peak position is used in step S23 (refer to FIG. 2).

If indefinite was not set as the priority determination in step S71, lens drive (reversal etc.) is carried out based on a priority evaluation value evaluation (S77). Processing here may be with firing priority or non-firing priority set as the priority determination, and carrying out drive direction determination of the photographing lens 11 and peak detection in accordance with AF evaluation value for setting the priority is set.

It is then determined whether or not it is firing priority (S79). Here, it is determined whether or not firing priority has been set in step S71 within the priority determination of step S11. If the result of this determination is firing priority, direction determination and peak detection are set to use a firing evaluation value (S81). Since firing priority is set in the priority determination, image data can be acquired from the image sensor 13 with the AF assist light source 35 in a firing state. As a result of the setting in this step S81, the direction determination of step S17, and the peak detection processing of step S19, are carried out using a firing AF evaluation value.

If the result of determination in step S79 is not firing priority, direction determination and peak detection are set to use a non-firing evaluation value (S83). Since non-firing priority is set in the priority determination, image data can be acquired from the image sensor 13 with the AF assist light source 35 in a non-firing state (turned off state). As a result of the setting in this step S81, the direction determination of step S17, and the peak detection processing of step S19, are carried out using a non-firing AF evaluation value.

In steps S81 and S83, if an evaluation value for direction determination and peak detection has been set, the lens drive speed is next set to double (S85). If the priority determination is set to indefinite, the AF assist light source 35 is repeatedly fired and not fired alternately, image data is acquired from the image sensor 13 in the respective states, and an AF evaluation value is calculated. Differing from this, in the case of firing priority or non-firing priority, the AF assist light source 35 continues in either the firing state or the turned off state. Accordingly, in the case of a lens drive speed that is the same as at the time of indefinite, the number of times sampling is carried out is doubled. In other words, in the case where a focus lens image plane movement amount per sampling interval is the same as that at the time of indefinite, it is possible to make drive speed of the photographing lens 11 double that at the time of indefinite, realizing speed increase.

If the lens drive speed has been doubled in step S85, or if parallel execution for direction determination and peak detection with firing and non-firing has been set in step S75, the originating flow is returned to.

In this way, with one embodiment of the present invention, in shooting still pictures, if indefinite is set as a priority setting when focusing is carried out using contrast AF, then together with commencement of scanning of the photographing lens 11, the AF assist light source 35 is repeatedly placed in a firing state and non-firing state in synchronization with frames of taken images, and a peak position of AF evaluation value in the firing state, and a peak position of AF evaluation value in the non-firing state, are detected. The photographing lens 11 is then driven to the focus position based on peak position of AF evaluation value in the non-firing state. However, in the event that it is not possible to move to the focus position using an AF evaluation value in the non-firing state, the lens is moved to the focus position using an AF evaluation value for the firing state. It is therefore possible, in a case where it is not possible to detect a focus position using an AF evaluation value in the non-firing state, to move to the focus position based on an AF evaluation value in the firing state without carrying out scanning of the photographing lens again.

Next, an example of a focusing operation of one embodiment of the present invention will be described using FIG. 6-FIG. 7. In both drawings, with priority determination from commencement to a specified frame at indefinite, the photographing lens 11 is scanned while the AF assist light source 35 repeatedly alternates between firing and non-firing, with FIG. 6 showing an example in the case of shooting the night scene through glass, and FIG. 7 showing an example in the case of shooting a person in the dark.

Figure 6:
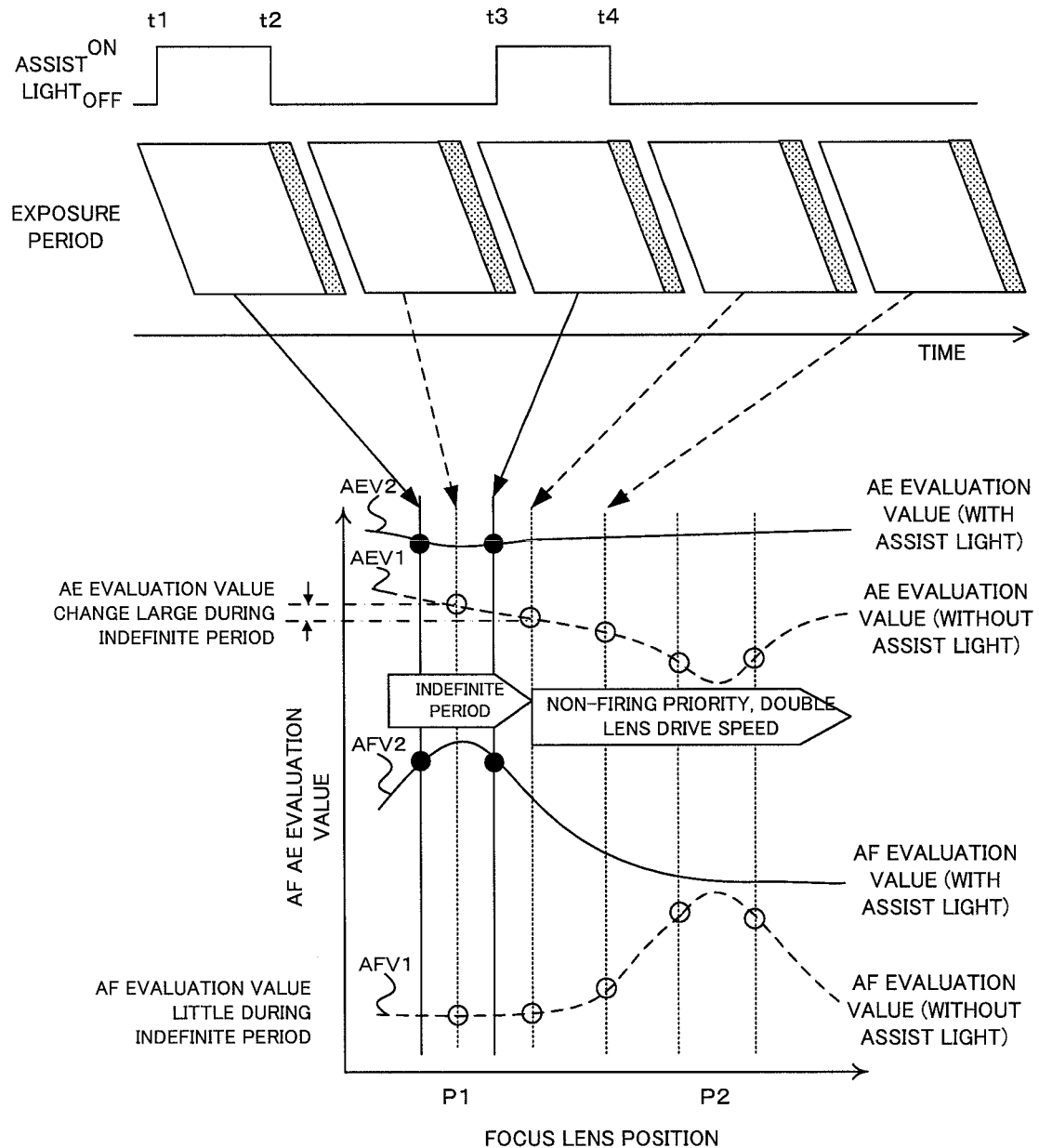
FIG. 6 is a graph showing one example of a relationship between focus lens position and AF-AE evaluation value at the time of shooting a night scene through glass, for the camera of one embodiment of the present invention.
Figure 7:
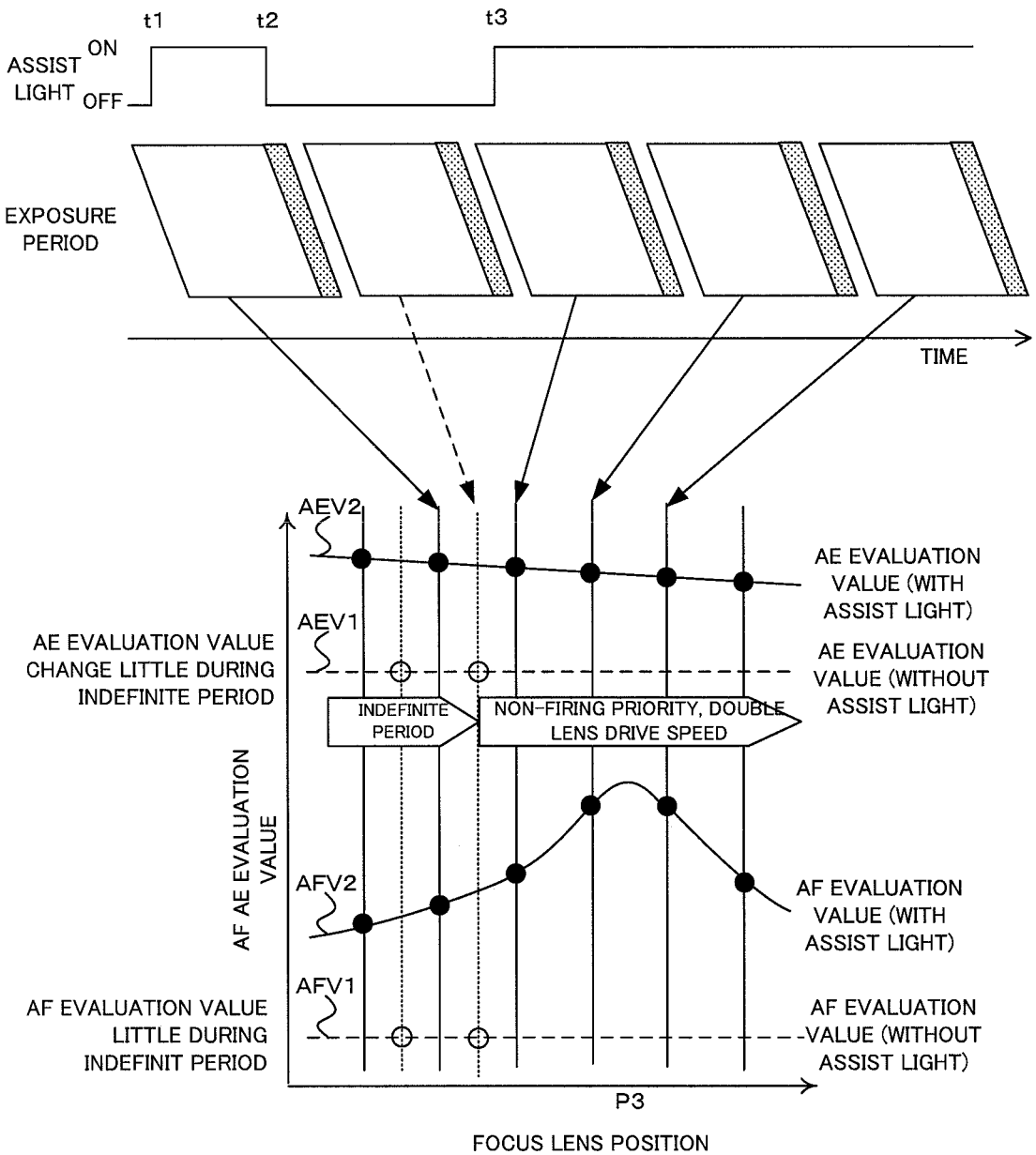
FIG. 7 is a graph showing one example of a relationship between focus lens position and AF-AE evaluation value at the time of shooting a person in a dark environment, for the camera of one embodiment of the present invention.

In FIG. 6, the uppermost portion shows on/off states of the AF assist light source 35, while the center portion shows exposure period for every frame, with the horizontal axis representing flow of time. The reason the exposure period for every single frame is parallelogram in shape is because the electronic shutter is a rolling shutter, and a shaded portion at the right end corresponds to a readout period. With the example shown in FIG. 6, the periods from time t1-t2 and t3-t4 are where the AF assist light source 35 is in the firing state, while the periods from time t2-t3 and t4 onwards are where the AF assist light source 35 is in the non-firing state (unlit state).

The lower part of FIG. 6 shows focus lens position of the photographing lens 11, and variation in AF evaluation value and AE evaluation value. It is possible to depict an AE evaluation value curve AEV1 by plotting AE evaluation values that have been calculated based on image data for every one frame acquired with the AF assist light source 35 in the non-firing state, and it is also possible to depict an AF evaluation value curve AFV1 by plotting AF evaluation values that have been acquired for every one frame at this time. Similarly, it is possible to depict an AE evaluation value curve AEV2 by plotting AE evaluation values that have been calculated based on image data for every one frame acquired with the AF assist light source 35 in the firing state, and it is also possible to depict an AF evaluation value curve AFV2 by plotting AF evaluation values that have been acquired for every one frame at this time.

In the case of shooting a night scene, even at the time of non-firing, it is possible to anticipate variations in a evaluation value to a certain extent due to variation in focus position of the photographing lens 11. With this embodiment therefore, as has been described previously, an AE evaluation value rate of change at the time of non-firing is calculated in step S51 (refer to FIG. 4), and if this rate of change is greater than or equal to a specified value non-firing priority is set (refer to S63 in FIG. 4). Similarly, since it is possible to anticipate variation in AF evaluation value, an AF evaluation value rate of change is calculated in step S53, and if this rate of change is greater than or equal to a specified value non-firing priority is set (refer to S63). If non-firing priority has been set, repeated firing of assist lighting as shown on the left side portion of FIG. 6 is completed, and scanning is carried out in a non-firing state as shown from the center to the right side portion of FIG. 6. At this time, the lens drive speed is made double that at the time of indefinite priority.

In the case of shooting a night scene through glass, as with the example shown in FIG. 6, the AF evaluation value curve AFV2 in the firing state (when there is assist light) peaks close to focus lens position P1. Conversely, the AF evaluation value curve AFV1 in the non-firing state (when there is no assist light) does not peak close to focus lens position P1, but peaks close to focus lens position P2. This is because in the case of the firing state, AF assist light is reflected by glass positioned at close range, giving a peak at the position where there is glass. Generally speaking a photographer will not want to focus on the glass, but rather on the night scene that is much further away, and so it can be said that the peak position of the AF evaluation value curve AFV2 is a false focus position, while the peak position of the AF evaluation value curve AFV1 is the focus position. Accordingly, in cases such as shooting a night scene through glass, it is preferable to execute the focusing operation based on the AF evaluation value curve AFV1 in the non-firing state. With the example of FIG. 6, non-firing priority is defined when the AE evaluation value during the indefinite period has an amount of change for curve AEV1 that becomes greater than or equal to a specified value. It is therefore possible for subsequent direction determination and peak detection to avoid false focus on glass by using the AF evaluation values at the time of non-firing.

Next, a case of shooting a person not through glass but in a dark environment will be described using FIG. 7. With the example of FIG. 7 also, the periods from time t1-t2 and t3 onwards are where the AF assist light source 35 is in the firing state, while the period from time t2-t3 is where the AF assist light source 35 is in the non-firing state. Also, similarly to the case of FIG. 6, it is possible to depict an AE evaluation value curve AEV1 by plotting AE evaluation values in the non-firing state, and depict an AF evaluation value curve AFV1 by plotting AF evaluation values. Similarly, it is possible to depict an AE evaluation value curve AFV2 by plotting AE evaluation values in the firing state, and depict an AF evaluation value curve AFV2 by plotting AF evaluation values.

With the example of FIG. 7, since it is in a dark environment the AE evaluation value curve AEV1 has no variation. The AF evaluation value curve AFV1 in the non-firing state (where there is no AF assist light) also has no variation, and it is not possible to detect a peak. Conversely, the AF evaluation value curve AFV2 in the firing state (when there is assist light) does have variation, and peaks close to focus lens position P3 of the photographing lens 11. Accordingly, in cases such as shooting a person in a dark environment, it is preferable to execute the focusing operation based on the AF evaluation value curve AFV2 in the firing state. In FIG. 7, there is no variation in either AE evaluation values or AF evaluation values at the time of non-firing during the indefinite period, and firing priority is defined. As a result, subsequent direction determination and peak detection are able to focus on a person in a dark environment by using the AF evaluation values at the time of firing.

As has been described above, with one embodiment of the present invention, the assist light section (AF assist light source 35 and AF assist light firing circuit 33) illuminates a subject by emitting light at a first luminance amount or a second luminance amount that is dimmer than the first luminance amount (including being off), and a control section 21 moves a photographing lens 11 to detect focus position of the photographing lens based on contrast values detected by a contrast detection section (AF evaluation value calculation circuit 19) at different positions of the photographing lens 11. Also, the control section 21 causes the assist light section to emit light at a first luminance amount or a second luminance amount (including being off) when acquiring arbitrary image data from an image sensor 13, and also detects focus position of the photographing lens 11 based on one of a first contrast value detected by the contrast detection section in a state where the assist light section emits light at the first luminance amount in accordance with position of the photographing lens 11, or a second contrast value detected in a state where the assist light section emits light at the second luminance amount (including being off) in accordance with position of the photographing lens 11. As a result, it is possible to carry out a focusing operation at high speed even in an environment such as where assist light is used. Specifically, since it is possible to acquire both first and second contrast values based on arbitrary image data while the assist light section emits lights at the first and second luminance amounts, it is possible to select optimum contrast in accordance with brightness of the surroundings etc.

Also, with the one embodiment of the present invention, a focusing operation for the photographing lens is carried out by selecting one of either a first focusing mode (S39, S61, S81) where a first focus position of the photographing lens is detected based on a first contrast value with light emitted at a first luminance amount, a second focusing mode (S37, S63, S83) where a second focus position of the photographing lens is detected based on a second contrast value with light emitted at a second luminance amount (including being off), or a third focusing mode (S41, S59, S73, S75) where first and second focus positions are detected by alternately emitting light at the first luminance amount and the second luminance amount (including being off), and one is selected. As a result, since it is possible to select the optimum focusing mode depending on the situation, it is possible to carry out a high-speed focusing operation even in an environment where assist light is used.

With the one embodiment of the present invention, zero emission is set as the second luminance amount that is dimmer than the first luminance amount. However, it is obviously also possible to set the second luminance amount not to zero light, but to a luminance amount that is dimmer than the first luminance amount.

Also, with the one embodiment of the present invention, there is determination by detecting both an AE evaluation value rate of change and an AF evaluation value rate of change (refer to S51-S55 of FIG. 4), but is also possible to perform determination by calculating only one or other of the rates of change.

Figure 4:
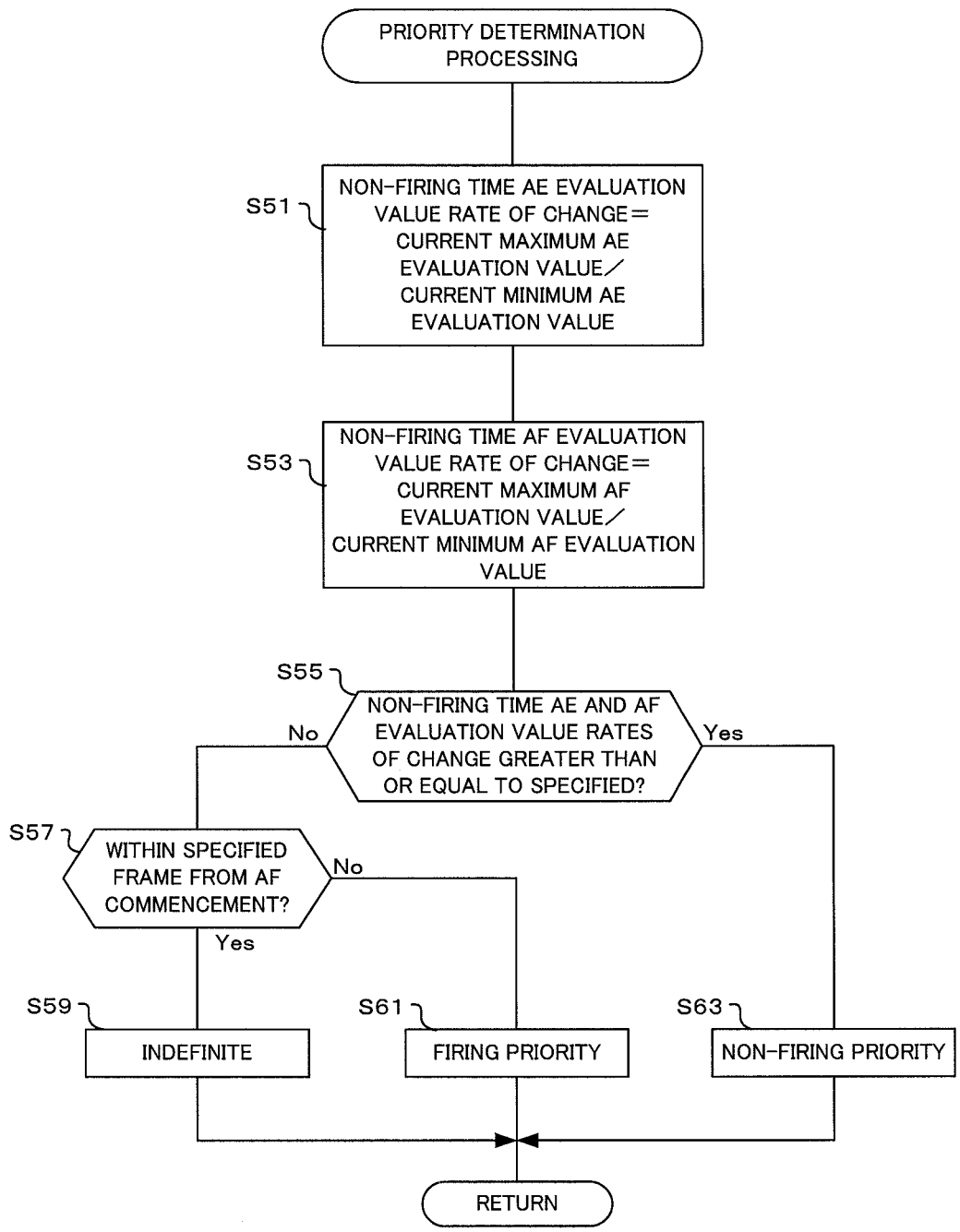
FIG. 4 is a flowchart showing operation for priority judgment processing of the camera of one embodiment of the present invention.

Also, with the one embodiment of the present invention, in selecting one of either a first contrast value based on image data at the time of firing or a second contrast value based on image data at the time of non-firing, determination is based on either subject brightness value (refer S31 in FIG. 3), or based on AE evaluation value rate of change or AF evaluation value rate of change at the time of non-firing (refer to S55 in FIG. 4). However, this is not limiting and it is also possible to perform determination based only on the value of the second contrast value.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. It is possible to apply the present invention in any of the above configurations provided it is a device that irradiates assist light when carrying out a focusing operation.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A camera having an image sensor for forming a subject image via a photographing lens, comprising:
   a contrast detection section for detecting a contrast value based on image data acquired from the image sensor;
   an assist light section for irradiating a subject by emitting light at a first luminance amount or a second luminance amount that is dimmer than the first luminance amount; and a control section moving the photographing lens and detecting a focus position of the photographing lens based on contrast values detected by the contrast detection section at different positions of the photographing lens, wherein the control section causes the assist light section to emit assist light in a first luminance amount or a second luminance amount when acquiring arbitrary image data from the image sensor, and detects a focus position of the photographing lens based on one of a first contrast value that is detected by the contrast detection section in a state where the assist light section emits light in the first luminance amount according to a position of the photographing lens, or a second contrast value that is detected by the contrast detection section in a state where the assist light section emits light in the second luminance amount according to a position of the photographing lens, and wherein the control section changes a position of the photographing lens over time, and detects the first contrast value and the second contrast value using the contrast detection section by causing the assist light section to alternately fire at the first luminance amount and the second luminance amount in accordance with the position of the photographing lens.

2. The camera of claim 1, further comprising:

a subject brightness detection section for detecting subject brightness based on image data acquired from the image sensor, and wherein the control section detects focus position of the photographing lens by selecting one of either a first contrast value or a second contrast value based on the subject brightness value detected with the assist light section firing at the second luminance amount.

3. The camera of claim 2, wherein:

the control section, when a rate of change of the subject brightness value detected by the subject brightness detection section at different positions of the photographing lens is lower than a specified value, detects the focus position of the photographing lens based on the first contrast value, and when the rate of change of the subject brightness value is greater than the specified value, detects the focus position of the photographing lens based on the second contrast value.

4. The camera of claim 2, wherein:

the control section selects one of either a first luminance amount or a second luminance amount in accordance with which of the first contrast value and the second contrast value is selected, and causes the assist light section to emit light, and also increases the speed at which the photographing lens is moved and then moves the photographing lens, and detects focus position.

5. The camera of claim 1, wherein:

the control section detects focus position of the photographing lens by selecting one of either the first contrast value or the second contrast value based on the contrast values detected with the assist light section firing at the second luminance amount.

6. The camera of claim 5, wherein:

the control section detects focus position of the photographing lens based on the first contrast value when the rate of change of the second contrast value is less than a second specified value, at different positions of the photographing lens, and detects focus position of the photographing lens based on the second contrast value when the rate of change of the contrast value is greater than the second specified value.

7. A camera having an image sensor for forming a subject image via a photographing lens, comprising:

a contrast detection section for detecting a contrast value based on image data acquired from the image sensor;

an assist light section for irradiating a subject by emitting light at a first luminance amount; and a control section for moving the photographing lens and detecting a focus position of the photographing lens based on contrast values detected by the contrast detection section at different positions of the photographing lens, wherein the control section causes the assist light section to either emit assist light in a first luminance amount or turn off when acquiring arbitrary image data from the image sensor, and detects a focus position of the photographing lens based on one of a first contrast value that is detected by the contrast detection section when the assist light section has emitted light in the first luminance amount, or a second contrast value that is detected in a state where the assist light section is off, and wherein the control section changes a position of the photographing lens over time, and detects the first contrast value and the second contrast value using the contrast detection section by causing the assist light section alternately fire at the first luminance amount and turn off in accordance with the position of the photographing lens.

8. The camera of claim 7, further comprising:

a subject brightness detection section for detecting subject brightness based on image data acquired from the image sensor, and wherein the control section detects focus position of the photographing lens by selecting one of either the first contrast value or the second contrast value based on the subject brightness value detected with the assist light section turned off.

9. The camera of claim 8, wherein:

the control section, when a rate of change of the subject brightness value detected by the subject brightness detection section at different positions of the photographing lens is lower than a specified value, detects the focus position of the photographing lens based on the first contrast value, and when the rate of change of the subject brightness value is greater than the specified value, detects the focus position of the photographing lens based on the second contrast value.

10. The camera of claim 8, wherein:

the control section selects one of either the first luminance amount or zero assist light emission in accordance with which of the first contrast value and the second contrast value is selected, and causes the assist light section to emit light, and also increases the speed at which the photographing lens is moved and then moves the photographing lens, and detects focus position.

11. The camera of claim 7, wherein:

the control section detects focus position of the photographing lens by selecting one of either the first contrast value or the second contrast value based on the contrast values detected with the assist light section turned off.

12. The camera of claim 11, wherein:

the control section detects focus position of the photographing lens based on the first contrast value when the rate of change of the second contrast value is less than a second specified value, at different positions of the photographing lens, and detects focus position of the photographing lens based on the second contrast value when the rate of change of the contrast value is greater than the second specified value.

13. A camera having an image sensor for forming a subject image via a photographing lens, comprising:
- a contrast detection section for detecting a contrast value based on image data acquired from the image sensor;
- an assist light section for irradiating a subject by emitting light at a first luminance amount; and
- a control section for carrying out focusing of the photographing lens by selecting either of a first focusing mode, where focus position of the photographing lens is detected, while moving the photographing lens, based on a first contrast value detected by the contrast detection section with a first luminance amount being emitted at a plurality of positions of the photographing lens, a second focusing mode, where a second focus position of the photographing lens is detected, while moving the photographing lens, based on a second contrast value detected by the contrast detection section with no assist light emitted at a plurality of positions of the photographing lens, or a third focusing mode where the first contrast value and second contrast value are detected by alternately repeating emission of the first luminance amount and no emission, while moving the photographing lens.

14. The camera of claim 13, further comprising:
- a subject brightness detection section for detecting subject brightness based on image data acquired from the image sensor, and wherein
- the control section commences focusing operation by selecting the third focusing mode, and then performs a focusing operation for the photographing lens by switching to one of either the first focusing mode or the second focusing mode based on the subject brightness value detected with the assist light section turned off.

15. The camera of claim 14, wherein:
- the control section, when a rate of change of subject brightness value detected by the subject brightness detection section at different positions of the photographing lens is less than or equal to a first specified value, switches to the first focusing mode and detects focus position of the photographing lens based on the first contrast value, while when rate of change of the subject brightness value is greater than or equal to the first specified value, switches to the second focusing mode and detects focus position of the photographing lens based on the second contrast value.

16. The camera of claim 14, wherein:
- the control section increases speed at which the photographing lens is moved in accordance with whether focusing mode is switched from the third focusing mode to the first focusing mode or to the second focusing mode, moves the photographing lens, and detects focus position.

17. The camera of claim 13, wherein:
- the control section commences a focusing operation by selecting the third focusing mode, and then detects focus position of the photographing lens by switching to one of either the first focusing mode or the second focusing mode based on the second contrast value detected with the assist light section turned off.

18. The camera of claim 17, wherein:
- the control section, when a rate of change of the second contrast value at different positions of the photographing lens is less than a second specified value, switches to the first focusing mode and detects focus position of the photographing lens based on the first contrast value, while when rate of change of the second contrast value is greater than the second specified value, switches to the second focusing mode and detects focus position of the photographing lens based on the second contrast value.

* * * * *